(12) United States Patent
Hoffmann

(10) Patent No.: US 9,115,850 B2
(45) Date of Patent: Aug. 25, 2015

(54) PRIORITY VALVE ASSEMBLY AND METHOD FOR OPERATING A PRIORITY VALVE ASSEMBLY

(71) Applicant: AIRBUS OPERATIONS GMBH, Hamburg (DE)

(72) Inventor: Lars Hoffmann, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 183 days.

(21) Appl. No.: 13/708,257

(22) Filed: Dec. 7, 2012

(65) Prior Publication Data
US 2013/0174917 A1    Jul. 11, 2013

Related U.S. Application Data

(63) Continuation of application No. PCT/EP2011/002840, filed on Jun. 9, 2011.

(60) Provisional application No. 61/353,917, filed on Jun. 11, 2010.

(30) Foreign Application Priority Data

Jun. 11, 2010   (DE) .................. 10 2010 023 495

(51) Int. Cl.
*G05D 11/00*   (2006.01)
*F17D 3/00*   (2006.01)
(Continued)

(52) U.S. Cl.
CPC ............. *F17D 3/00* (2013.01); *F15B 13/022* (2013.01); *B64D 11/04* (2013.01); *Y10T 137/0396* (2015.04); *Y10T 137/86485* (2015.04)

(58) Field of Classification Search
USPC ............ 137/115.17, 118.06, 118.07, 505.13, 137/505.18; 417/299
See application file for complete search history.

(56) References Cited

U.S. PATENT DOCUMENTS 3,628,558 A     12/1971   Bahl
3,723,025 A *   3/1973   Coakley ................. 417/299
(Continued)

FOREIGN PATENT DOCUMENTS

CN    1134133    10/1996
CN    1918389    2/2007
(Continued)

OTHER PUBLICATIONS

International Search Report dated Nov. 28, 2011.
(Continued)

*Primary Examiner* — Kevin Murphy
*Assistant Examiner* — R. K. Arundale
(74) *Attorney, Agent, or Firm* — Dickinson Wright PLLC

(57) ABSTRACT

A priority valve assembly includes a fluid supply line, a first fluid discharge line, and a second fluid discharge line, both of which are to be supplied with fluid via the fluid supply line. A priority valve throttles a fluid flow from the fluid supply line into the second fluid discharge line to prioritize the supply of fluid to the first fluid discharge line over the supply of fluid to the second fluid discharge line if a control parameter which is characteristic for an inlet fluid pressure ($p_E$) in the fluid supply line falls below a first predetermined threshold value ($p_2$). The priority valve reduces the throttling of the fluid flow from the fluid supply line into the second fluid discharge line if the control parameter falls below a second predetermined threshold old value ($p_4$) which is smaller than the first predetermined threshold value ($p_2$).

11 Claims, 5 Drawing Sheets

(51) Int. Cl.
 *F15B 13/02* (2006.01)
 *B64D 11/04* (2006.01)

(56) References Cited

U.S. PATENT DOCUMENTS

| | | | |
|---|---|---|---|
| 4,556,078 A | 12/1985 | Wittren | |
| 5,836,347 A * | 11/1998 | Harries | 137/487.5 |
| 7,334,597 B1 * | 2/2008 | Hughes et al. | 137/115.17 |
| 2005/0284143 A1 | 12/2005 | Mamei | |
| 2007/0175521 A1 | 8/2007 | Krug-Kussius | |

FOREIGN PATENT DOCUMENTS

| | | |
|---|---|---|
| JP | 49-58534 | 6/1974 |
| JP | 51-51831 | 5/1976 |
| JP | 7-310840 | 11/1995 |
| WO | 2004/046561 | 6/2004 |

OTHER PUBLICATIONS

Written Opinion of the International Searching Authority dated Nov. 28, 2011.

Translation of Chinese Office Action dated Aug. 18, 2014.

* cited by examiner

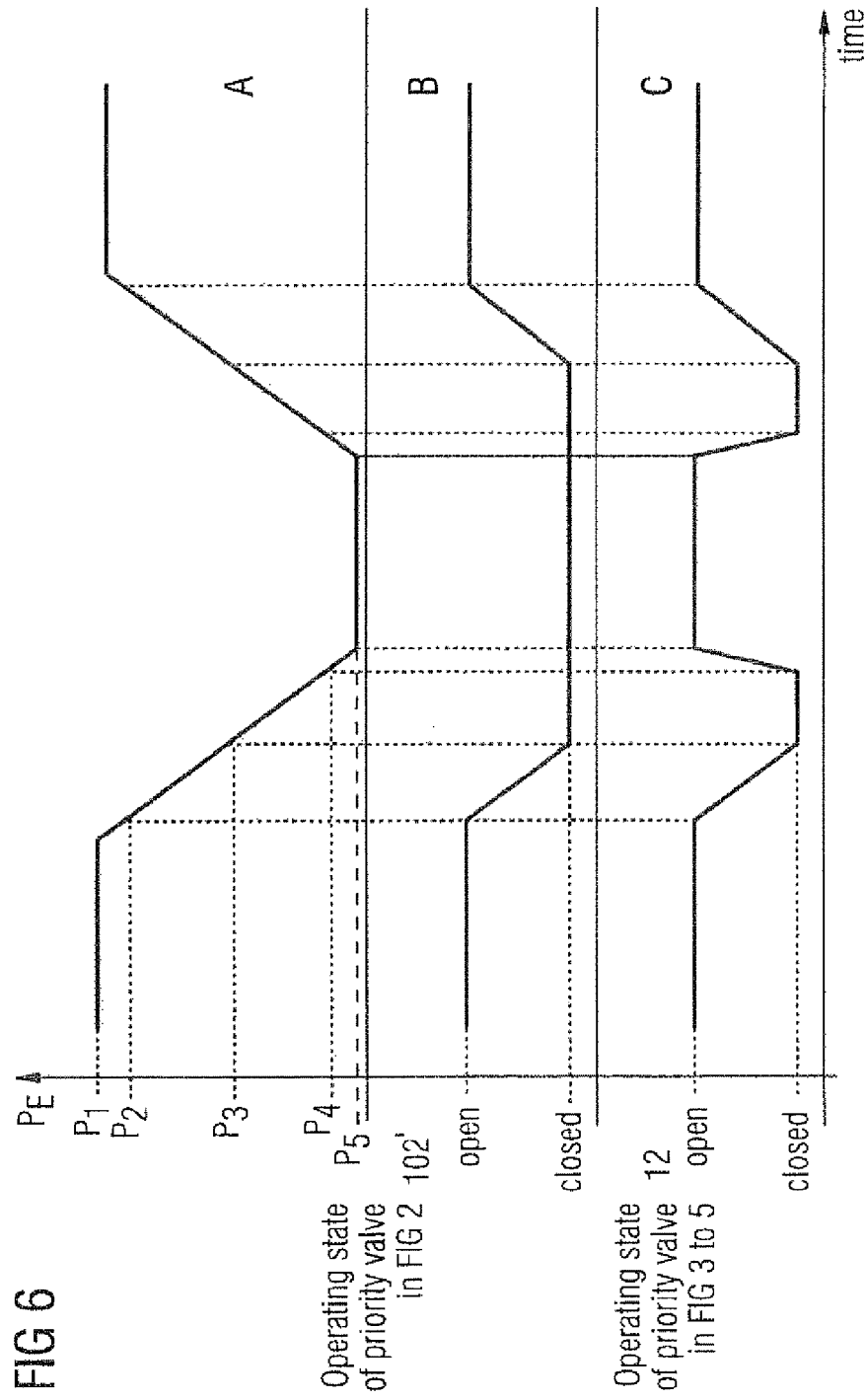

PRIORITY VALVE ASSEMBLY AND METHOD FOR OPERATING A PRIORITY VALVE ASSEMBLY

CROSS REFERENCE TO RELATED APPLICATIONS

This application is a continuation application under 35 USC 111(a) of PCT/EP2011/002840 filed Jun. 9, 2011, which is entitled to and claims priority based on German patent application no. 10 2010 023 495.8 filed Jun. 11, 2010 and U.S. provisional application No. 61/353,917 filed Jun. 11, 2012, the disclosures of each of which, including the specification, drawings and abstract, are incorporated herein by reference in their entirety.

FIELD

The invention relates to a priority valve assembly which is particularly suitable for use in an aircraft and a method for operating a priority valve assembly of this type.

BACKGROUND

Modern aircraft, in particular commercial aircraft, incorporate a plurality of fluid systems, i.e. systems in which a fluid is guided through corresponding lines during operation. The systems, which are generally described as "fluid systems" here, include for example the air conditioning system, the water supply network and the diverse hydraulic systems of the aircraft. In the case of many of these systems, a plurality of consumers are supplied with a fluid, i.e. a liquid, a gas or a liquid/gas mixture, by a single fluid source, with the term "consumers" here not only referring to "end consumers", i.e. components and systems on board the aircraft which are to be supplied with fluid during operation, but also "continuing" lines, i.e. lines of the fluid systems which are arranged downstream of a line bifurcation and are supplied with fluid by a common supply line arranged upstream of the line bifurcation.

During operation of the fluid systems, operating situations can arise in which it is desirable or necessary to influence a fluid distribution to a plurality of consumers in such a way that the supply of fluid to one or more selected consumers is granted greater priority than the supply of fluid to another consumer or other consumers. For example, consumers which fulfil safety-relevant functions on board the aircraft have greater priority in the supply of fluid than consumers whereof a failure merely affects comfort on board the aircraft. Prioritising individual consumers in the supply of fluid is particularly expedient if the fluid pressure or fluid volume flow provided by a fluid source is not sufficient to supply fluid adequately to all the consumers to be supplied with fluid by the fluid source.

Priority valve assemblies 100, 100' shown by way of example in FIGS. 1 and 2 are therefore used in different fluid systems on board an aircraft. In the priority valve assembly 100 shown in FIG. 1, a priority valve 102 is connected on the inlet side to a fluid supply line 104 and on the outlet side to two fluid discharge lines 106, 108 which are to be supplied with fluid parallel to one another by way of the fluid supply line 104.

If an inlet fluid pressure $p_E$ which is sufficient to supply a desired fluid volume flow to both fluid discharge lines 106, 108 acts on the inlet side of the priority valve 102 by way of a control pressure line 110, the priority valve 102 is located in a position which ensures that a desired fluid flow, which may optionally also be varied depending on the operating situation, is supplied to both fluid discharge lines 106, 108. On the other hand, if the inlet fluid pressure $p_E$ acting on the inlet side of the priority valve 102 falls below a predetermined threshold value for which an adequate fluid supply to both fluid discharge lines 106, 108 can no longer be ensured, the supply of fluid to the first fluid discharge line 106 is prioritised over the supply of fluid to the second fluid discharge line 108, i.e. the priority valve 102 moves into a position in which the priority valve 102 maintains the fluid supply from the fluid supply line 104 into the first fluid discharge line 106, but throttles or, if necessary, also completely interrupts the fluid supply into the second fluid discharge line 108.

In the priority valve assembly 100' shown in FIG. 2, a priority valve 102' is connected on the inlet side to a fluid supply line 104' from which a first fluid discharge line 106' branches off upstream of the priority valve 102'. On the outlet side, the priority valve 102' is connected to a second fluid discharge line 108' which is to be supplied with fluid by way of the fluid supply line 104'.

If, by way of a control pressure line, the inlet side of the priority valve 102' is acted upon by an inlet fluid pressure $p_E$ sufficient to supply a desired fluid volume flow, which may optionally also be varied depending on the operating situation, to both fluid discharge lines 106', 108', the priority valve 102' is located in an open position so that the desired fluid volume flow is supplied to both fluid discharge lines 106', 108'. On the other hand, if the inlet fluid pressure $p_E$ acting on the inlet side of the priority valve 102' falls below a predetermined threshold value for which an adequate fluid supply to both fluid discharge lines 106', 108' can no longer be ensured, the supply of fluid to the first fluid discharge line 106' is prioritised over the supply of fluid to the second fluid discharge line 108', i.e. the priority valve 102' moves into a position in which the priority valve 102' throttles or, if necessary, also completely interrupts the fluid supply from the fluid supply line 104' into the second fluid discharge line 108' so that the fluid supply from the fluid supply line 104' into the first fluid discharge line 106' branching off from the fluid supply line 104' upstream of the priority valve 102' can be held at a desired level.

SUMMARY

The invention is aimed at the object of providing a priority valve assembly which is particularly suitable for use in an aircraft and a method for operating a priority valve assembly of this type, which facilitate the operation and maintenance of a fluid system equipped with the priority valve assembly.

This object is achieved by a priority valve assembly, in particular for use in an aircraft, having a fluid supply line, a first fluid discharge line which is to be supplied with fluid by way of the fluid supply line, a second fluid discharge line which is to be supplied with fluid by way of the fluid supply line, and a priority valve which is designed to throttle a fluid flow from the fluid supply line into the second fluid discharge line for the purpose of prioritising the supply of fluid to the first fluid discharge line over the supply of fluid to the second fluid discharge line if a control parameter which is characteristic for an inlet fluid pressure (pE) in the fluid supply line falls below a first predetermined threshold value (p2), characterised in that the priority valve is furthermore designed to reduce the throttling of the fluid flow from the fluid supply line into the second fluid discharge line if the control parameter which is characteristic for the inlet fluid pressure (pE) in the fluid supply line falls below a second predetermined threshold value (p4) which is smaller than the first predetermined threshold value (p2) and a method for operating a priority valve assembly having the features described above.

The priority valve assembly according to the invention, which is particularly suitable for use in an aircraft, comprises a fluid supply line, a first fluid discharge line to be supplied with fluid by way of the fluid supply line and a second fluid discharge line to be supplied with fluid by way of the fluid supply line. It is possible for the priority valve assembly according to the invention to comprise only one fluid supply line, only one first fluid discharge line and only one second fluid discharge line. If necessary, however, the priority valve assembly can also be equipped with a plurality of fluid supply lines, a plurality of first fluid discharge lines and/or a plurality of second fluid discharge lines. Furthermore, the priority valve assembly comprises a priority valve. The priority valve is designed to throttle a fluid flow from the fluid supply line into the second fluid discharge line for the purpose of prioritising the supply of fluid to the first fluid discharge line over the supply of fluid to the second fluid discharge line if a control parameter which is characteristic for an inlet fluid pressure in the fluid supply line falls below a first predetermined threshold value.

The inlet fluid pressure in the fluid supply line can itself be used as a characteristic control parameter. However, as an alternative to this, it is also conceivable to use another parameter directly associated with the inlet fluid pressure, for example an inlet fluid volume flow in the fluid supply line, a flow rate of the fluid in the fluid supply line or the like, as the control parameter for controlling the priority valve. The throttling of the fluid flow from the fluid supply line into the second fluid discharge line by means of the priority valve can be effected for example by reducing a flow cross-section of a fluid connection between the fluid supply line and the second fluid discharge line. Depending on requirements, in the course of throttling the fluid flow from the fluid supply line into the second fluid discharge line, the priority valve can simply reduce or completely interrupt the fluid flow, i.e. the fluid volume flow from the fluid supply line into the second fluid discharge line.

The priority valve of the priority valve assembly according to the invention is furthermore designed to reduce the throttling of the fluid flow from the fluid supply line into the second fluid discharge line if the control parameter which is characteristic for the inlet fluid pressure in the fluid supply line falls below a second predetermined threshold value which is smaller than the first predetermined threshold value. A reduction in the throttling of the fluid flow from the fluid supply line into the second fluid discharge line by means of the priority valve results in an increase in the fluid volume flow from the fluid supply line into the second fluid discharge line. The reduction in the throttling of the fluid flow from the fluid supply line into the second fluid discharge line by means of the priority valve can be effected for example by increasing a flow cross-section of a fluid connection between the fluid supply line and the second fluid discharge line. By reducing the throttling of the fluid flow from the fluid supply line into the second fluid discharge line, it is essentially possible to increase the fluid volume flow from the fluid supply line into the second fluid discharge line starting from a low level. However, by reducing the throttling of the fluid flow from the fluid supply line into the second fluid discharge line, the fluid supply from the fluid supply line into the second fluid discharge line is preferably resumed after a complete interruption of the fluid supply from the fluid supply line into the second fluid discharge line.

The present invention is based on the knowledge that, in a fluid system such as that used on board an aircraft in an air conditioning system or a hydraulic system, although it can be advantageous or, for safety reasons, sometimes even necessary to prioritise the supply of fluid to individual consumers, the use of conventional priority valves (shown by way of example in FIGS. 1 and 2) in these fluid systems hinders the maintenance of the fluid systems and the operation of the fluid systems after maintenance. It has been established in particular that, during maintenance of the fluid system, it can be very difficult and time-consuming to empty or fill portions of a fluid system which are separated from the fluid supply line by a priority valve through the interruption of a fluid connection between a fluid supply line and the portions of the fluid system when an inlet fluid pressure in the fluid supply line falls below a predetermined threshold value.

Furthermore, the fluid filling pressure which results when filling a fluid system, for example during operation of the system or when recommissioning the system after emptying, is usually significantly lower than the operating pressure prevailing in the system during normal operation of the system and also significantly lower than the threshold value for the inlet fluid pressure in the fluid supply line at which the priority valve interrupts the fluid connection between the fluid supply line and a non-prioritised portion of the fluid system. It is therefore impossible to fill the non-prioritised system portion with fluid by way of the fluid supply line with a fluid filling pressure which is below the threshold value for the inlet fluid pressure in the fluid supply line.

The priority valve assembly according to the invention overcomes these problems by the fitting of a priority valve which, if the control parameter which is characteristic for the inlet fluid pressure in the fluid supply line falls below the first predetermined threshold value, indeed provides for a prioritisation of the first fluid discharge line during the supply of fluid, i.e. throttling the fluid supply from the fluid supply line into the second fluid discharge line, but effects a reduction in the throttling of the fluid flow from the fluid supply line into the second fluid discharge line if the control parameter falls below the second predetermined threshold value. The second predetermined threshold value is preferably selected so that it does not usually arise in normal operation of a fluid system equipped with the priority valve assembly according to the invention, only if the system is emptied or filled.

The priority valve of the priority valve assembly according to the invention is preferably designed to interrupt the fluid flow from the fluid supply line into the second fluid discharge line completely for the purpose of prioritising the supply of fluid to the first fluid discharge line over the supply of fluid to the second fluid discharge line if the control parameter which is characteristic for the inlet fluid pressure in the fluid supply line falls below a third predetermined threshold value which is smaller than the first predetermined threshold value but greater than the second predetermined threshold value. The priority valve preferably enables a continuously variable throttling of the fluid flow into the second fluid discharge line in favour of the fluid flow into the first fluid discharge line in operating situations of the priority valve assembly in which the control parameter is between the first and the third predetermined threshold value. Only if the control parameter falls below the third predetermined threshold value is the second fluid discharge line completely separated from the fluid supply line so that the supply of fluid from the fluid supply line to the second fluid discharge line can be maintained as long as possible.

The priority valve can furthermore be designed to cancel the throttling of the fluid flow from the fluid supply line into the second fluid discharge line completely if the control parameter which is characteristic for the inlet fluid pressure in the fluid supply line falls below a fourth predetermined threshold value which is smaller than the second predetermined threshold value. The priority valve preferably enables a continuously variable reduction in the throttling of the fluid flow into the second fluid discharge line in operating situations of the priority valve assembly in which the control parameter is between the second and the fourth predetermined threshold value.

The first predetermined threshold value is preferably greater than the second predetermined threshold value by a factor of 10 to 100. This ensures that the prioritisation of the supply of fluid to the first fluid discharge line over the supply of fluid to the second fluid discharge line is not inadvertently impaired or even cancelled. In a priority valve assembly in which the inlet fluid pressure in the fluid supply line is approximately 200 bar or greater than 200 bar in normal operation of the priority valve assembly, the first predetermined threshold value for a control parameter which corresponds directly to the inlet fluid pressure in the fluid supply line can be in a pressure range of approximately 160 to 180 bar. The second predetermined threshold value can then be for example approximately 5 bar. The third predetermined threshold value is then for example between approximately 130 and 150 bar.

The priority valve assembly according to the invention can comprise a control unit which is designed to record and evaluate the control parameter which is characteristic for the inlet fluid pressure in the fluid supply line. The control unit can be constructed for example in the form of an electronic control unit and comprise corresponding sensors to measure the control parameter which is characteristic for the inlet fluid pressure. The control unit can furthermore be designed to control the operation of the priority valve depending on the control parameter. The priority valve can then be constructed for example in the form of a solenoid valve which may be controlled by corresponding electrical signals from the control unit.

In particular if the priority valve assembly according to the invention comprises a control unit for controlling the priority valve, it is possible to use, as the priority valve, a valve comprising a valve body which is preferably continuously variably adjustable simply between an open position and a closed position. The control unit can then direct the valve body into its open position if the control parameter which is characteristic for the inlet fluid pressure in the fluid supply line is above the first predetermined threshold value or below the second predetermined threshold value. On the other hand, however, if the control parameter is between the first and the second predetermined threshold value, the control unit preferably directs the valve body into a position in which the valve body either throttles or completely interrupts the fluid supply into the second fluid discharge line, whereby a continuously variable throttling of the fluid supply into the second fluid discharge line is preferably possible by positioning the valve body accordingly.

The control function of the priority valve can, however, also be realised hydraulically by a corresponding design of the valve. With a purely hydraulically controllable priority valve, it is possible to dispense with the use of a control unit, which means that the priority valve assembly is generally less susceptible to faults. Furthermore, it goes without saying that a configuration of the priority valve assembly is also conceivable in which the control function of the priority valve may be realised purely hydraulically but which also additionally comprises a control unit, for example for redundancy, which can ensure that the priority valve is actuated accordingly as required.

In particular if the control function of the priority valve is to be realised purely hydraulically, the priority valve preferably comprises a valve housing and a valve body which is displaceably received in the valve housing. The valve body may be movable between a plurality of operating positions. In a first open position, the valve body preferably opens a first fluid connection between the fluid supply line and the second fluid discharge line if the control parameter which is characteristic for the inlet fluid pressure in the fluid supply line is greater than the first predetermined threshold value. Furthermore, the valve body can be in a throttling position in which the valve body reduces a flow cross-section of the first fluid connection between the fluid supply line and the second fluid discharge line if the control parameter which is characteristic for the inlet fluid pressure in the fluid supply line falls below the first predetermined threshold value. Finally, the valve body can preferably assume a second open position which is different from the first open position and in which the valve body opens a second fluid connection between the fluid supply line and the second fluid discharge line if the control parameter which is characteristic for the inlet fluid pressure in the fluid supply line falls below the second predetermined threshold value. The valve body is preferably displaceably received in the valve housing of the priority valve in such a way that, with a displacement relative to the valve housing, the valve body can be displaced in a direction from its first open position into its throttling position and, with a further displacement, in the same direction from its throttling position into its second open position.

The priority valve of the priority valve assembly according to the invention is preferably constructed such that the valve body is subjectable to a pressure corresponding to the inlet fluid pressure in the fluid supply line. As a result of the pressure acting on the valve body, the valve body can be displaced in the valve housing. For example, the valve body can be connected in fluid-conducting manner to a pressure chamber which is in turn connected to the fluid supply line so that a pressure corresponding to the inlet fluid pressure in the fluid supply line prevails in the pressure chamber and can be applied to the valve body. For example, the valve body can be arranged directly in the pressure chamber so that the pressure which prevails in the pressure chamber and corresponds to the inlet fluid pressure in the fluid supply line can act on an end face of the valve body. Furthermore, the priority valve preferably comprises an actuating element which exerts an actuating force on the valve body which counteracts the pressure acting on the valve body. The actuating element can be constructed for example in the form of a spring or it can comprise a spring. As an alternative to this, it is also possible to use an actuating element with an electrically or mechanically actuable actuator.

The actuating element is preferably constructed in such a way that, if the control parameter which is characteristic for the inlet fluid pressure in the fluid supply line is greater than the first predetermined threshold value, the valve body is held in its first open position by the pressure acting on the valve body against the actuating force exerted on the valve body by the actuating element. The actuating element is furthermore preferably constructed such that, if the control parameter which is characteristic for the inlet fluid pressure in the fluid supply line falls below the first predetermined threshold value, the valve body is moved into its throttling position by the pressure acting on the valve body against the actuating force exerted on the is valve body by the actuating element. The valve body is preferably held in its throttling position by the pressure acting on the valve body as long as the control parameter which is characteristic for the inlet fluid pressure in the fluid supply line is greater than the second predetermined threshold value. Finally, the design of the actuating element preferably ensures that the valve body is moved into its second open position by the actuating force exerted on the valve body by the actuating element if the control parameter which is characteristic for the inlet fluid pressure in the fluid supply line falls below the second predetermined threshold value.

In a method according to the invention for operating a priority valve assembly which is particularly suitable for use in an aircraft, a fluid is conducted through a fluid supply line which is connected to a first and a second fluid discharge line. The supply of fluid to the first fluid discharge line is prioritised over the supply of fluid to the second fluid discharge line by means of a priority valve which throttles a fluid flow from the fluid supply line into the second fluid discharge line if a control parameter which is characteristic for an inlet fluid pressure in the fluid supply line falls below a first predetermined threshold value. The priority valve furthermore reduces the throttling of the fluid flow from the fluid supply line into the second fluid discharge line if the control parameter which is characteristic for the inlet fluid pressure in the fluid supply line falls below a second predetermined threshold value which is smaller than the first predetermined threshold value.

To prioritise the supply of fluid to the first fluid discharge line over the supply of fluid to the second fluid discharge line, the priority valve can interrupt the fluid flow from the fluid supply line into the second fluid discharge line completely if the control parameter which is characteristic for the inlet fluid pressure in the fluid supply line falls below a third predetermined threshold value which is smaller than the first predetermined threshold value but greater than the second predetermined threshold value. The priority valve can furthermore cancel the throttling of the fluid flow from the fluid supply line into the second fluid discharge line completely if the control parameter which is characteristic for the inlet fluid pressure in the fluid supply line falls below a fourth predetermined threshold value which is smaller than the second predetermined threshold value.

The first predetermined threshold value can be greater than the second predetermined threshold value by a factor of 10 to 100.

A control unit can record and evaluate the control parameter which is characteristic for the inlet fluid pressure in the fluid supply line. Furthermore, the control unit can control the operation of the priority valve depending on the control parameter.

In addition or alternatively to this, the function of the priority valve can be realised hydraulically. In particular, during operation of the priority valve, a valve body of the priority valve which is received in a valve housing can be moved into a first open position in which the valve body opens a first fluid connection between the fluid supply line and the second fluid discharge line if the control parameter which is characteristic for the inlet fluid pressure in the fluid supply line is greater than the first predetermined threshold value. Furthermore, the valve body can assume a throttling position in which the valve body reduces a flow cross-section of the first fluid connection between the fluid supply line and the second fluid discharge line if the control parameter which is characteristic for the inlet fluid pressure in the fluid supply line falls below the first predetermined threshold value. Finally, the valve body can be moved into a second open position which is different from the first open position and in which the valve body opens a second fluid connection between the fluid supply line and the second fluid discharge line if the control parameter which is characteristic for the inlet fluid pressure in the fluid supply line falls below the second predetermined threshold value.

The valve body may be subjected to a pressure which corresponds to the inlet fluid pressure in the fluid supply line. An actuating element of the priority valve can furthermore exert an actuating force on the valve body, which counteracts the pressure acting on the valve body.

In a preferred embodiment of the method according to the invention, if the control parameter which is characteristic for the inlet fluid pressure in the fluid supply line is greater than the first predetermined threshold value, the valve body is held in its first open position by the pressure acting on the valve body against the actuating force exerted on the valve body by the actuating element. On the other hand, if the control parameter which is characteristic for the inlet fluid pressure in the fluid supply line falls below the first predetermined threshold value, the valve body is moved into its throttling position by the pressure acting on the valve body against the actuating force exerted on the valve body by the actuating element and held in its throttling position as long as the control parameter which is characteristic for the inlet fluid pressure in the fluid supply line is greater than the second predetermined threshold value. Finally, the valve body can be moved into its second open position by the actuating force exerted on the valve body by the actuating element if the control parameter which is characteristic for the inlet fluid pressure in the fluid supply line falls below the second predetermined threshold value.

A fluid system according to the invention which is particularly suitable for use in an aircraft comprises at least one priority valve assembly described above. The fluid system can, for example, be part of an air conditioning system, a water supply system or a hydraulic system of the aircraft.

BRIEF DESCRIPTION OF THE DRAWINGS

A preferred embodiment of the invention is now explained in more detail with reference to the accompanying schematic drawings, which show:

FIG. 6 a chart which shows the operation of the priority valve assembly illustrated in FIGS. 3 to 5.

Figure 2:
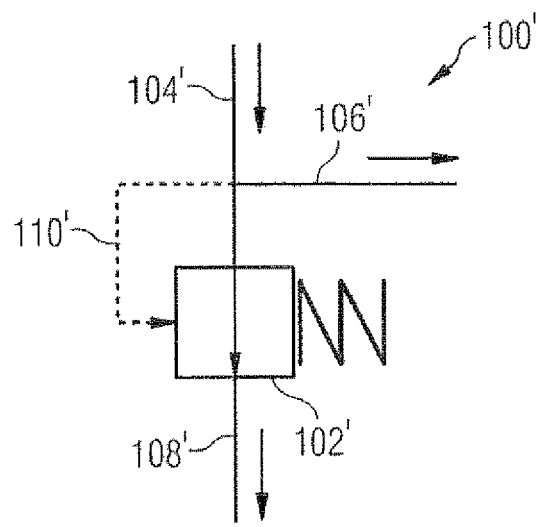
FIG. 2 a second embodiment of a priority valve assembly known from the prior art.
Figure 3:
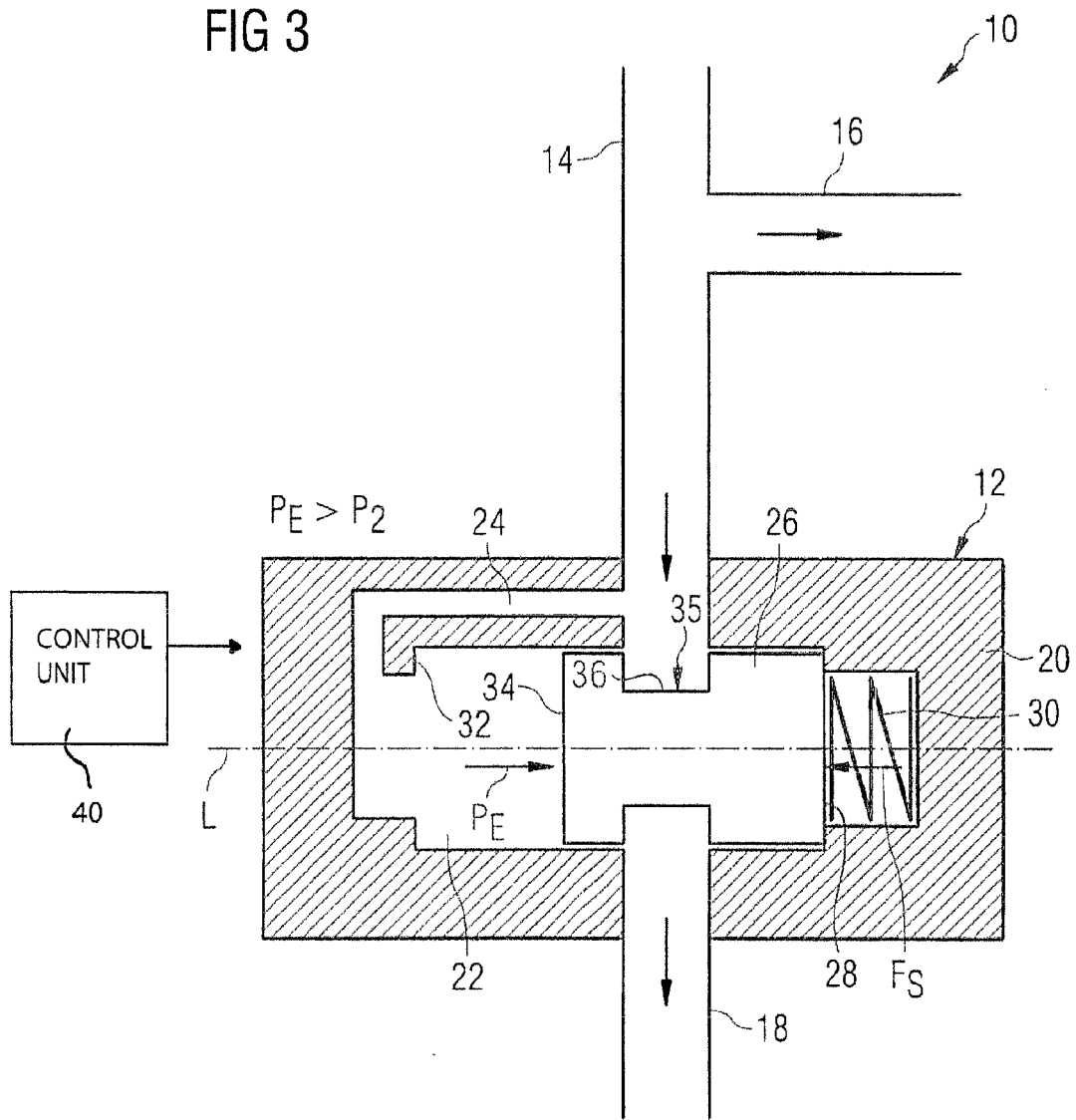
FIG. 3 a priority valve assembly according to the invention, in which a valve body of a priority valve is in a first open position.
Figure 4:
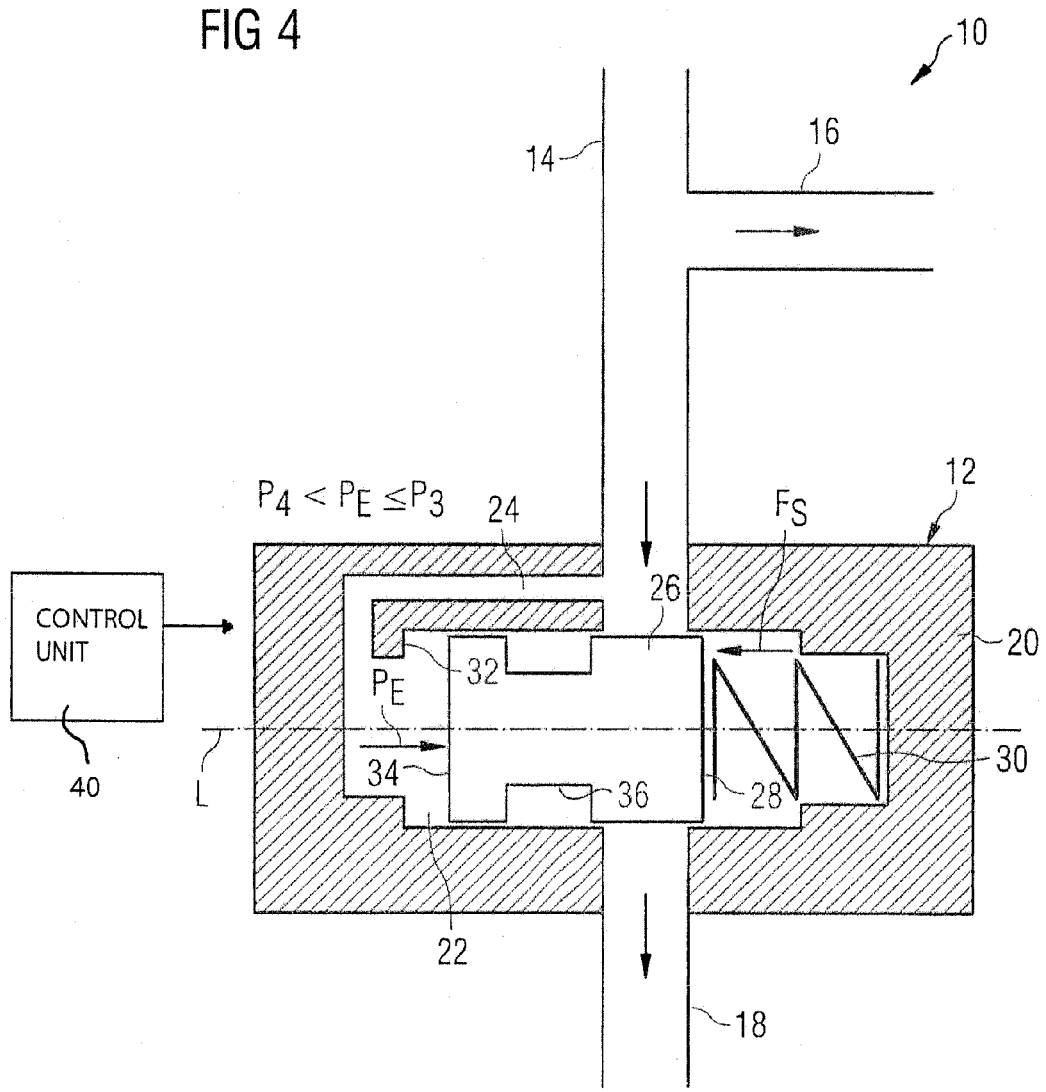
FIG. 4 the priority valve assembly according to FIG. 3, in which the valve body of the priority valve is in a throttling position.
Figure 5:
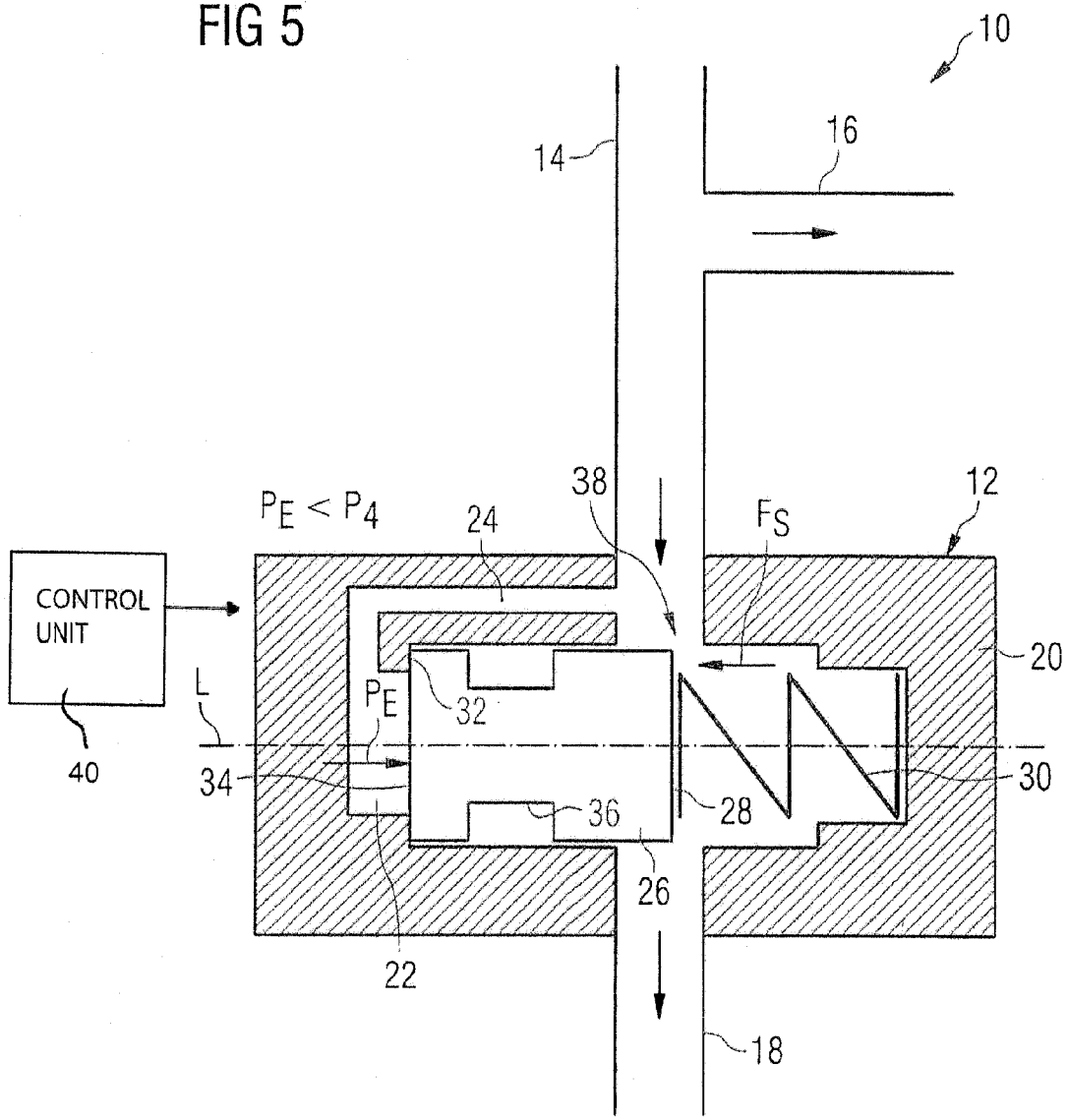
FIG. 5 the priority valve assembly according to FIG. 3, in which the valve body of the priority valve is in a second open position.

A priority valve assembly 10 which is shown in FIGS. 3 to 5 and is suitable for use in a fluid system, for example an air conditioning system, a water supply system or a hydraulic system of an aircraft, comprises a priority valve 12 which is connected on the inlet side to a fluid supply line 14. Upstream of the priority valve 12, a first fluid discharge line 16 branches off from the fluid supply line 14. On the outlet side, the priority valve 12 is connected to a second fluid discharge line 18 which is to be supplied with fluid by way of the fluid supply line 14. The basic construction of the priority valve assembly 10 shown in FIGS. 3 to 5 therefore corresponds to the basic construction of the priority valve assembly 100' shown in FIG. 2. However, the priority valve assembly 10 according to FIGS. 3 to 5 differs from the priority valve assembly 100' according to FIG. 2, which is known from the prior art, in the construction of the priority valve 12 and its control during operation of the priority valve assembly 10.

The priority valve 12 comprises a valve housing 20 in which a pressure chamber 22 is constructed. The pressure chamber 22 is connected by way of a control pressure line 24 to the fluid supply line 14 so that the pressure chamber 22 is acted upon by a pressure corresponding to an inlet fluid pressure $p_E$ in the fluid supply line 14. In other words, the fluid pressure in the pressure chamber 22 corresponds to the inlet fluid pressure $p_E$ in the fluid supply line 14. A valve body 26 is received in the pressure chamber 22 such that it is displaceable relative to the valve housing 20 along a longitudinal axis L of the priority valve 12.

In the region of a first end face 28 (the right-hand end face in FIGS. 3 to 5), the valve body 26 is connected to an actuating element 30 constructed in the form of a spring. The actuating element 30 exerts an actuating force $F_S$ on the valve body 26, which pushes the valve body 26 in the direction of a mechanical end stop 32, i.e. to the left in FIGS. 3 to 5. The actuating force $F_S$ exerted on the valve body 26 by the actuating element 30 thus counteracts the pressure $p_E$ which is applied by way of the pressure chamber 22 to a second end face 34 opposing the first end face 28 of the valve body 26 and pushes the valve body 26 in the direction of the actuating element 30, i.e. to the right in FIGS. 3 to 5.

The operation of the priority valve assembly 10 illustrated in FIGS. 3 to 5 is explained below with reference to FIG. 6. In its upper section A, the chart shown in FIG. 6 illustrates the course of the inlet fluid pressure $p_E$ prevailing in the fluid supply line 14 during an operating cycle of the priority valve assembly 10. In its central section B, the chart shows the operating state of the priority valve 102' of the known priority valve assembly 100' illustrated in FIG. 2 during an operating is cycle of the priority valve assembly 100'. Finally, in its lower section C, the chart shows the operating state of the priority valve 12 of the priority valve assembly 10 illustrated in FIGS. 3 to 5 during an operating cycle of the priority valve assembly 10.

As long as an inlet fluid pressure $p_E \geq p_1$ prevails in the fluid supply line 14 and an inlet fluid volume flow which is sufficient to supply the first and the second fluid discharge line 16, 18 with adequate fluid flows through the fluid supply line 14, the valve body 26 is held in its first open position shown in FIG. 3 by the pressure in the pressure chamber 22, which acts on the valve body 26 and corresponds to the inlet fluid pressure $p_E$ in the fluid supply line 14. If the valve body 26 is in its open position (shown in FIG. 3) in the valve housing 20, the valve body 26 establishes a first fluid connection 35 between the fluid supply line 14 and the second fluid discharge line 18 by way of a valve groove 36 constructed in a circumferential surface of the valve body 26. The fluid flowing through the fluid supply line 14 is therefore conducted into both the fluid discharge line 16 and the second fluid discharge line 18, whereby it is obviously possible to direct the fluid supply from the fluid supply line 14 into the second fluid discharge line 18 by means of the priority valve 12 depending on the operating situation, i.e. to increase or reduce the fluid volume flow from the fluid supply line 14 into the second fluid discharge line 18 as required depending on the operating situation.

If the inlet fluid pressure $p_E$ in the fluid supply line 14 sinks to a value $<p_1$, for example owing to an inadequate fluid supply from a fluid source into the fluid supply line 14, and finally reaches a first threshold value $p_2$, the priority valve 12 throttles the fluid flow from the fluid supply line into the second fluid discharge line by reducing the flow cross-section of the first fluid connection 35 in that the valve body 26 of the priority valve 12 is displaced relative to the valve housing 22 against the pressure pE acting on the second end face 34 of the valve body 26 in the direction of the end stop 32 as a result of the actuating force $F_S$ exerted on the valve body 26 by the actuating element 30. If the valve body 26 of the priority valve 12 is in its position shown in FIG. 4, the priority valve 12 interrupts the fluid supply from the fluid supply line 14 into the second fluid discharge line 18. The valve body 26 of the priority valve 12 assumes this position if the inlet fluid pressure $p_E$ in the fluid supply line 14 has reached a value $p_3$ corresponding to a third threshold value. The second end face 34 of the valve body 26 is however still at a predetermined spacing from the end stop 32.

As shown in FIG. 6, the priority valve 12, like the priority valve 102', enables a continuously variable throttling of the fluid supply from the fluid supply line 14, 104' into the second fluid discharge line 18, 108' until the fluid connection between the fluid supply line 14 and the second fluid discharge line 18, 108' is completely interrupted when the inlet fluid pressure $p_E$ in the fluid supply line 14, 104 has reached the value $p_3$.

If the inlet fluid pressure $p_E$ in the fluid supply line 14 is less than $p_3$, the fluid connection between the fluid supply line 14 and the second fluid discharge line 18 initially remains interrupted, i.e. the valve body 26 of the priority valve remains in its throttling position shown in FIG. 4. However, if the inlet fluid pressure $p_E$ in the fluid supply line 14 reaches a second predetermined threshold value $p_4$ which is still below $p_3$, the valve body 26 in the valve housing 20 is displaced further to the left in FIGS. 3 to 5 by the actuating force $F_S$ exerted on the valve body 26, i.e. the first end face 28 of the valve body 26, by the actuating element 30 against the pressure acting on the second end face 34 of the valve body 26 until the valve body 26, i.e. the second end face 34 of the valve body 26, comes to lie against the end stop 32. In this second open position, the valve body 26 opens a second fluid connection between the fluid supply line 14 and the second fluid discharge line 18 so that fluid can again flow from the fluid supply line 14 into the second fluid discharge line 18. As shown in FIG. 6, a continuously variable increase in the flow cross-section of the second fluid connection between the fluid supply line 14 and the second fluid discharge line 18 is possible until the flow cross-section of the second fluid connection in the position of the valve body 26 shown in FIG. 5 again corresponds to the maximum flow cross-section of the first fluid connection 35 which is created by way of the valve groove 36 when the valve body 26 is in its first open position as shown in FIG. 3.

The inlet fluid pressure prevailing in the fluid supply line 14 during normal operation of the priority valve assembly 10 is ≥200 bar. The first predetermined threshold value $p_2$ at which the valve body 26 is displaced increasingly from its first open position shown in FIG. 3 into its throttling position is at approximately 160 to 180 bar. The valve body 26 reaches its position shown in FIG. 4 if the inlet fluid pressure $p_E$ is at $p_3$=approximately 140 bar. The second predetermined threshold value $p_4$ is at approximately 5 bar, i.e. a displacement of the valve body 26 into its second open position according to FIG. 5 is possible if the inlet fluid pressure in the fluid supply line 14 falls below a value of $p_4$=approximately 5 bar.

The difference between the first threshold value $p_2$ and the second threshold value $p_4$ is therefore selected such that, in normal operation of the priority valve assembly 10, an undesired opening of the priority valve 12 is virtually impossible. Instead, the second threshold value $p_4$ of approximately 5 bar is only achieved if a fluid system equipped with the priority valve assembly 10 is emptied for example in the course of a maintenance process and/or is filled with a low fluid filling pressure of <5 bar. In these operating situations, it is then advantageously ensured that the second fluid discharge line 18 can also be emptied or filled properly.

In the embodiment of the priority valve assembly 10 shown in FIGS. 3 to 5, the function of the priority valve 12 is realised purely hydraulically. Alternatively or in addition to this, the priority valve assembly 10 can, however, also comprise a control unit 40 which is designed to record and evaluate the inlet fluid pressure $p_E$ in the fluid supply line 14. Furthermore, the control unit, which can be constructed for example in the form of an electronic control unit, can control the operation of the priority valve 12 as described above, depending on the inlet fluid pressure $p_E$ in the fluid supply line 14.

Figure 1:
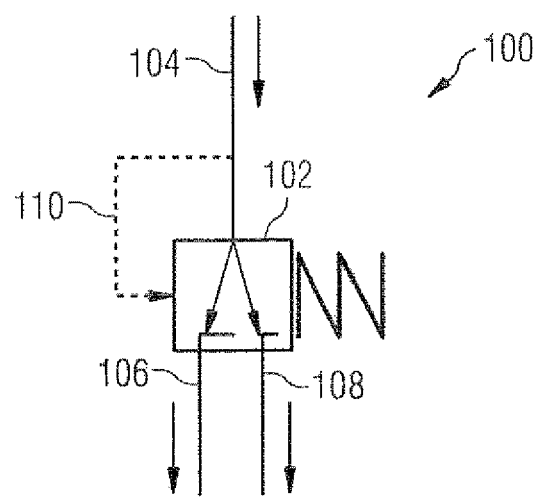
FIG. 1 a first embodiment of a priority valve assembly known from the prior art.

It is furthermore conceivable to equip the priority valve assembly 10 with a priority valve which, like the priority valve 102 of the priority valve assembly 100 shown in FIG. 1, comprises an internal fluid-conducting bifurcation through which a fluid flow flowing through a fluid supply line is divided into a first and a second fluid discharge line depending on the position of the priority valve. However, as explained above, the priority valve is then in turn constructed such that, when the inlet fluid pressure in the fluid supply line falls below the predetermined second threshold value, it again opens a fluid connection between the fluid supply line and the second fluid discharge line which is throttled or interrupted if a first predetermined inlet fluid pressure in the fluid supply line is not reached.

The invention claimed is:

1. A priority valve assembly comprising:
a fluid supply line,
a first fluid discharge line which is to be supplied with fluid by way of the fluid supply line,
a second fluid discharge line which is to be supplied with fluid by way of the fluid supply line, and
a priority valve which is structured (i) to allow a fluid flow from the fluid supply line into the second fluid discharge line if a control parameter which is characteristic for an inlet fluid pressure ($p_E$) in the fluid supply line is greater than a first predetermined threshold value ($p_2$),
wherein the priority valve is further structured (ii) to throttle a fluid flow from the fluid supply line into the second fluid discharge line for the purpose of prioritising the supply of fluid to the first fluid discharge line over the supply of fluid to the second fluid discharge line if the control parameter which is characteristic for the inlet fluid pressure ($p_E$) in the fluid supply line falls below the first predetermined threshold value ($p_2$) and (iii) to maintain the throttling of the fluid flow from the fluid supply line into the second fluid discharge line as long as the control parameter which is characteristic for the inlet fluid pressure in the fluid supply line is greater than a second predetermined threshold value ($p_4$), and
wherein the priority valve is furthermore structured (iv) to reduce the throttling of the fluid flow from the fluid supply line into the second fluid discharge line if the control parameter which is characteristic for the inlet fluid pressure ($p_E$) in the fluid supply line falls below the second predetermined threshold value ($p_4$) which is smaller than the first predetermined threshold value ($p_2$),
wherein the priority valve includes a single one-piece valve body and a single spring that applies a force solely in one direction parallel to the longitudinal axis of the valve body and wherein said inlet fluid pressure is applied parallel to said longitudinal axis from a single direction opposite to said force applied by said spring.

2. A priority valve assembly according to claim 1, wherein the first predetermined threshold value ($p_2$) is greater than the second predetermined threshold value ($p_4$) by a factor of 10 to 100.

3. A priority valve assembly according to claim 1, further comprising a control unit which is structured to record and evaluate the control parameter which is characteristic for the inlet fluid pressure ($p_E$) in the fluid supply line and which is furthermore structured to control the operation of the priority valve depending on the control parameter.

4. A priority valve assembly according to claim 1, wherein the priority valve comprises a valve housing and the valve body is subjectable to a pressure corresponding to the inlet fluid pressure ($p_E$) in the fluid supply line and that the priority valve furthermore comprises an actuating element which exerts an actuating force ($F_S$) on the valve body which counteracts the pressure corresponding to the inlet fluid pressure ($p_E$) acting on the valve body.

5. A priority valve assembly according to claim 4, wherein the actuating element is constructed in such a way that:
if the control parameter which is characteristic for the inlet fluid pressure ($p_E$) in the fluid supply line is greater than the first predetermined threshold value ($p_2$), the valve body is held in a first open position by the pressure acting on the valve body against the actuating force ($F_S$) exerted on the valve body by the actuating element, said first open position corresponding to said maximum fluid flow,
if the control parameter which is characteristic for the inlet fluid pressure ($P_E$) in the fluid supply line falls below the first predetermined threshold value ($p_2$), the valve body is moved from said first open position to a shut-off position by the pressure acting on the valve body against the actuating force ($F_s$) exerted on the valve body by the actuating element and is held in said shut-off position as long as the control parameter which is characteristic for the inlet fluid pressure ($p_E$) in the fluid supply line is equal to the second predetermined threshold value ($p_4$), said shut-off position corresponding to said interrupted fluid flow, and
if the control parameter which is characteristic for the inlet fluid pressure ($p_E$) in the fluid supply line falls below the second predetermined threshold value ($p_4$), the valve body is moved into a second open position by the actuating force ($F_s$) exerted on the valve body by the actuating element, said second open position corresponding to said reduced fluid flow of operation (iv).

6. A method of operating a priority valve assembly, the priority valve assembly including a priority valve a single one-piece valve body and a single springy, the method comprising:
(a) conducting a fluid through a fluid supply line which is connected to a first and a second fluid discharge line,
(b) operating said priority valve to allow a fluid flow from the fluid supply line into the second fluid discharge line if a control parameter which is characteristic for an inlet fluid pressure ($p_E$) in the fluid supply line is greater than a first predetermined threshold value ($p_2$), and
(c) operating said priority valve to prioritize the supply of fluid to the first fluid discharge line over the supply of fluid to the second fluid discharge line by throttling a fluid flow from the fluid supply line into the second fluid discharge line if the control parameter which is characteristic for the inlet fluid pressure ($p_E$) in the fluid supply line falls below the first predetermined threshold value ($p_2$) and to maintain the throttling of the fluid flow from the fluid supply line into the second fluid discharge line as long as the control parameter which is characteristic for the inlet fluid pressure ($p_E$) in the fluid supply line is greater than a second predetermined threshold value ($p_4$), and (d) operating the priority valve reduce the throttling of the fluid flow from the fluid supply line into the second fluid discharge line if the control parameter which is characteristic for the inlet fluid pressure ($p_E$) in the fluid supply line falls below the second predetermined threshold value ($p_4$) which is smaller than the first predetermined threshold value ($p_2$), wherein the spring applies a force solely in one direction parallel to the longitudinal axis of the valve body and said inlet fluid pressure is applied parallel to said longitudinal axis from a single direction opposite to said force at a force applied by said spring.

7. A method according to claim 6,
wherein the first predetermined threshold value ($p_2$) is greater than the second predetermined threshold value ($p_4$) by a factor of 10 to 100.

8. A method according to claim 6,
wherein a control unit records and evaluates the control parameter which is characteristic for the inlet fluid pressure ($p_E$) in the fluid supply line and controls the operation of the priority valve depending on the control parameter.

9. A method according to claim 8,
wherein the valve body is subjected to a pressure corresponding to the inlet fluid pressure ($p_E$) in the fluid supply line and an actuating element of the priority valve furthermore exerts an actuating force ($F_S$) on the valve body which counteracts the pressure corresponding to the inlet fluid pressure ($p_F$) acting on the valve body.

10. A method according to claim 9,
wherein:
if the control parameter which is characteristic for the inlet fluid pressure ($p_E$) in the fluid supply line is greater than the first predetermined threshold value ($p_2$), the valve body is held in a first open position by the pressure acting on the valve body against the actuating force ($F_S$) exerted on the valve body by the actuating element, if the control parameter which is characteristic for the inlet fluid pressure ($P_E$) in the fluid supply line falls below the first predetermined threshold value ($p_2$), the valve body is moved from said first open position to a shut-off position by the pressure acting on the valve body against the actuating force ($F_S$) exerted on the valve body by the actuating element, and is held in said shut-off position as long as the control parameter which is characteristic for the inlet fluid pressure ($p_E$) in the fluid supply line is equal to the second predetermined threshold value ($p_4$), and if the control parameter which is characteristic for the inlet fluid pressure ($p_E$) in the fluid supply line falls below the second predetermined threshold value ($p_4$), the valve body is moved into a second open position by the actuating force ($F_s$) exerted on the valve body by the actuating element.

11. A fluid system, characterised by a priority valve assembly according to claim 1.

* * * * *